March 29, 1955
C. L. DAY ET AL
2,704,929
REFRIGERANT EVAPORATOR
Filed Nov. 12, 1949
6 Sheets-Sheet 1
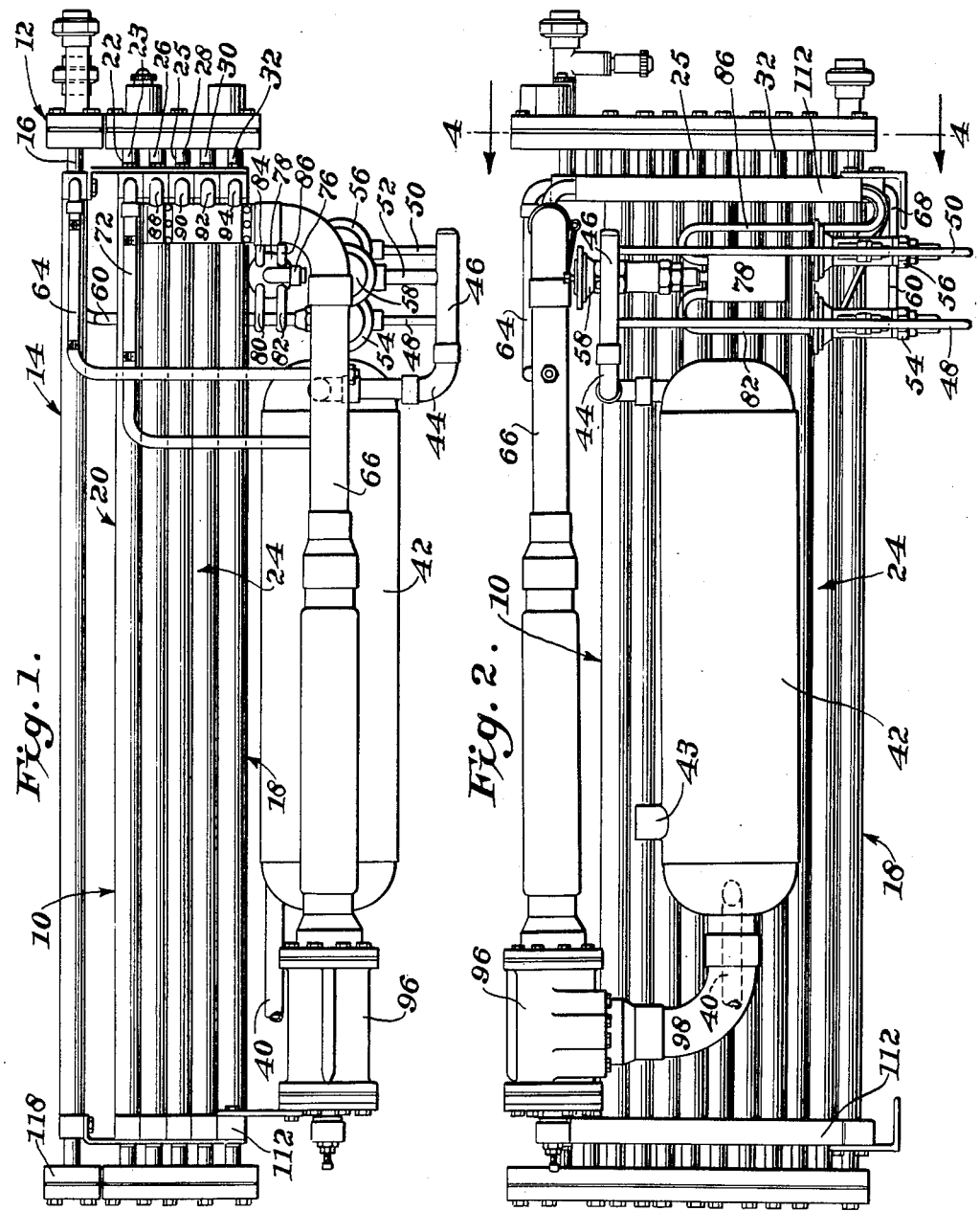
INVENTORS:
Carl L. Day,
Wilmer D. Regnier,
BY Cushman, Darby & Cushman
ATTORNEYS

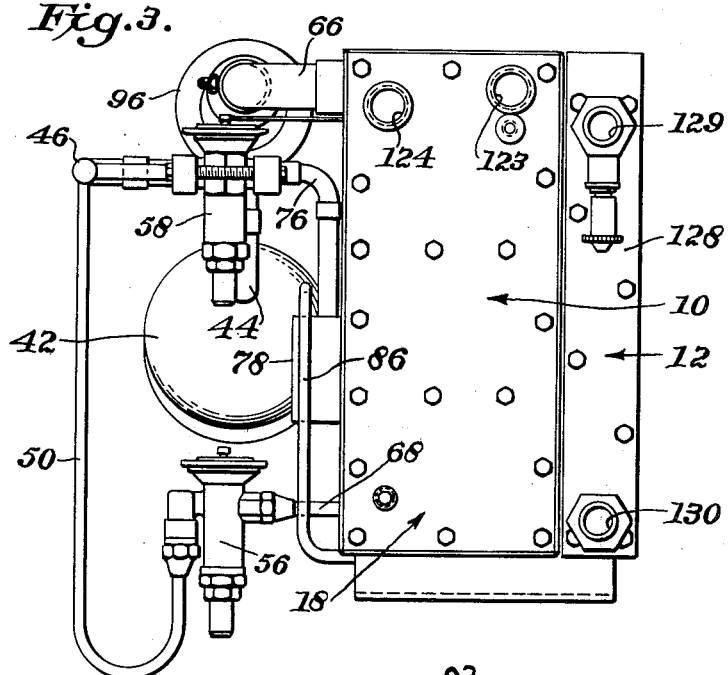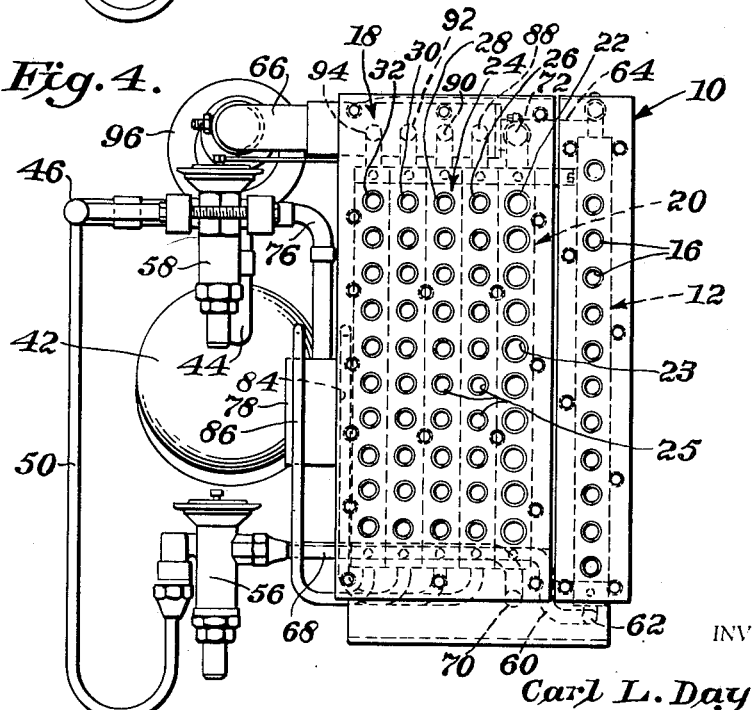

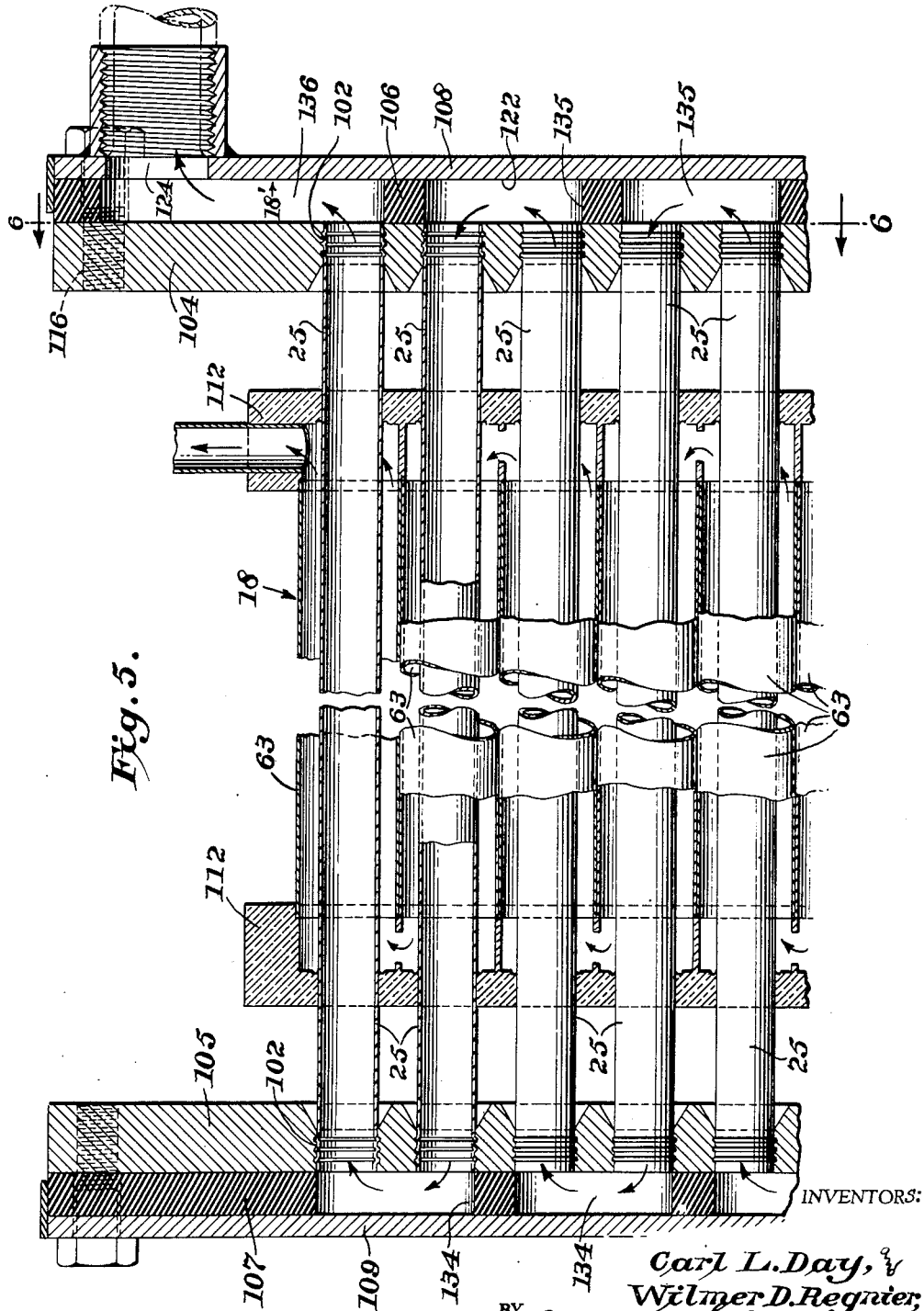

March 29, 1955  C. L. DAY ET AL  2,704,929
REFRIGERANT EVAPORATOR
Filed Nov. 12, 1949  6 Sheets-Sheet 4

INVENTORS:
Carl L. Day,
Wilmer D. Regnier;
BY Cushman, Darby & Cushman
ATTORNEYS

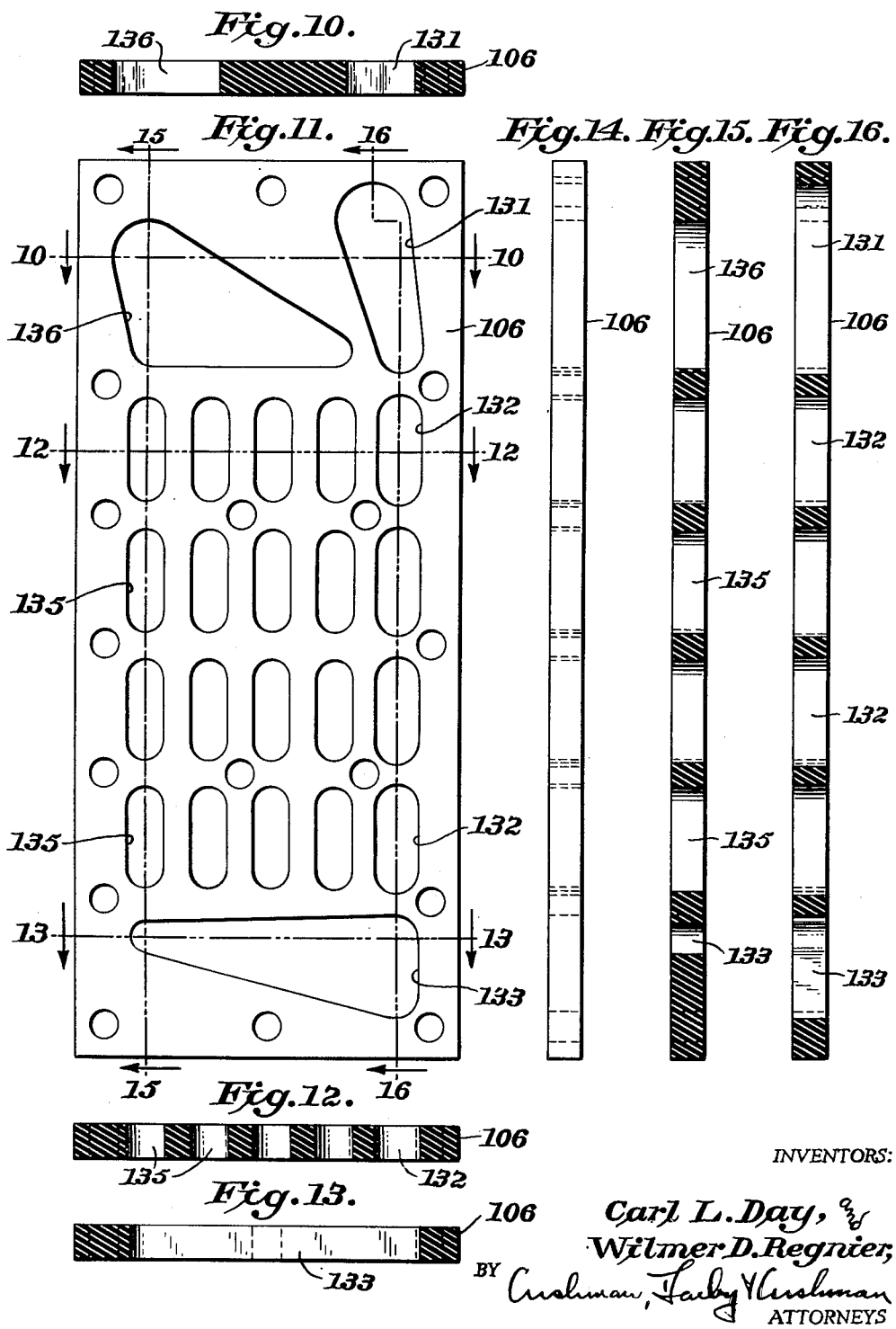

March 29, 1955 C. L. DAY ET AL 2,704,929
REFRIGERANT EVAPORATOR
Filed Nov. 12, 1949 6 Sheets-Sheet 6
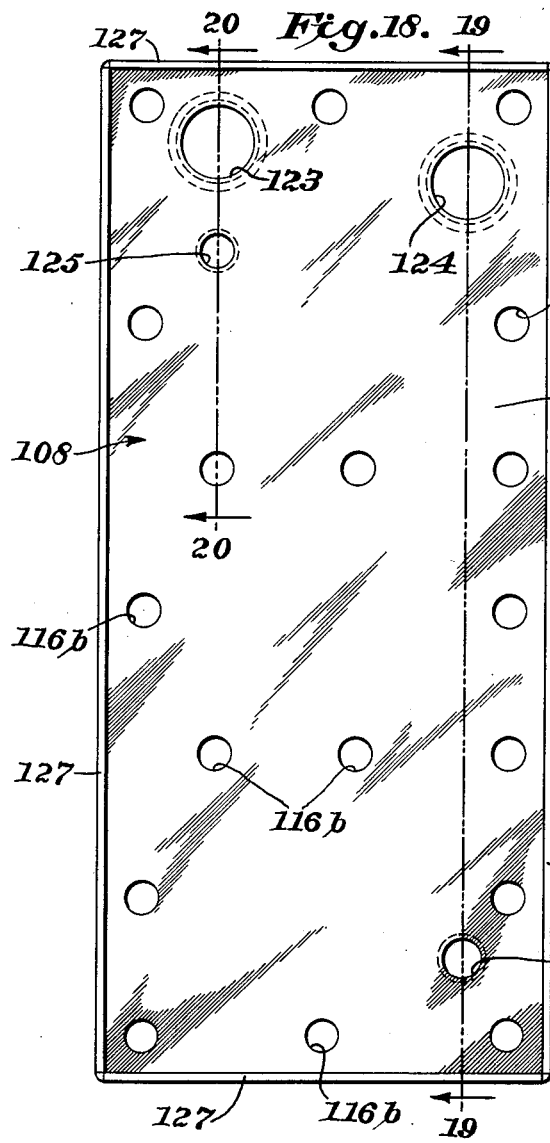
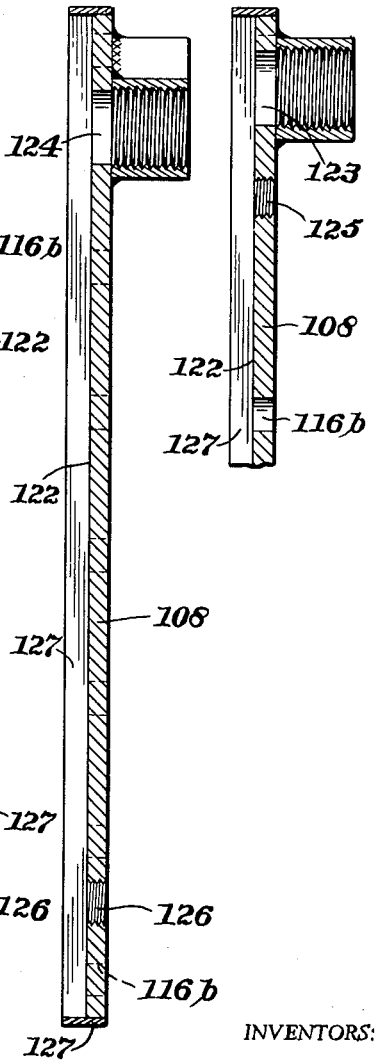
INVENTORS:
Carl L. Day,
Wilmer D. Regnier,
BY Cushman, Darby & Cushman
ATTORNEYS.

United States Patent Office 2,704,929
Patented Mar. 29, 1955

2,704,929

REFRIGERANT EVAPORATOR

Carl L. Day and Wilmer D. Regnier, Baltimore, Md., assignors to Crown Cork & Seal Company, Inc., Baltimore, Md., a corporation of New York Application November 12, 1949, Serial No. 126,732

1 Claim. (Cl. 62—126)

The present invention relates to evaporators for refrigeration systems.

In the bottling of carbonated beverages, it is desirable to cool the water before it is carbonated because water at a lowered temperature has greater affinity for carbon dioxide gas. Also, it is desirable to have the syrup used in the beverage cooled to a temperature somewhat below the room temperature at which it is blended and settled, because if the syrup is too warm when it is placed in the bottle or otherwise mixed with the carbonated water, the water will foam, thereby releasing the carbon dioxide placed therein during carbonation. Whatever cooling system is provided to cool or reduce the temperature of water and syrup must have its evaporator or heat exchanger of such construction that it can be readily cleaned.

An object of the present invention is to provide an evaporator or heat exchanger for use in systems for cooling liquids which is of such design that it can be readily disassembled and cleaned.

Another object of the invention is to provide an evaporator for use in a system for cooling liquids which comprises a minimum number of parts and which are so arranged that they can be readily taken apart for cleaning and wherein all surfaces with which the liquid contacts can be readily cleaned when the parts are disassembled.

A further object of the invention is the provision of an evaporator unit wherein both the water and syrup can be cooled.

While the water used in a carbonated beverage should have its temperature only slightly above the freezing point, it is not desirable to cool the syrup to such a low temperature because its viscosity is thereby increased. Hence, if the water and syrup are both cooled in the same refrigeration apparatus, it is necessary to make provision for cooling the water to a lower temperature than the syrup.

Still another object of the invention is to provide an evaporator assembly of such design that while the water and syrup cooling portions are connected to the same basic refrigerant supply, the water will be cooled to a lower temperature than the syrup.

Another object of the invention is to provide an evaporator wherein optimum cooling of the water is accomplished by subjection of the water to a pre-cooling stage.

Other objects and advantages of the invention will be apparent from the following specification and accompanying drawings.

In the drawings,

Figure 1 is a top plan view of an evaporator assembly and certain of the elements of the refrigeration system in which it is used.

Figure 2 is a side view of the Figure 1 structure.

Figure 3 is an end view of the structure of Figures 1 and 2 looking from the right toward those figures.

Figure 4 is a transverse section on the line 4—4 of Figure 2, i. e., a figure showing the Figure 3 structure but with certain end plates and gaskets removed.

Figure 5 is a sectional view of the water cooling evaporator taken on a line extending axially of a bank of the water cooling tubes.

Figure 10 is a transverse section on the line 10—10 of Figure 11.

Figure 11 is a face view of a gasket provided in the water cooling unit, the view being taken looking in the same direction as the view of Figures 4 and 6.

Figure 6:
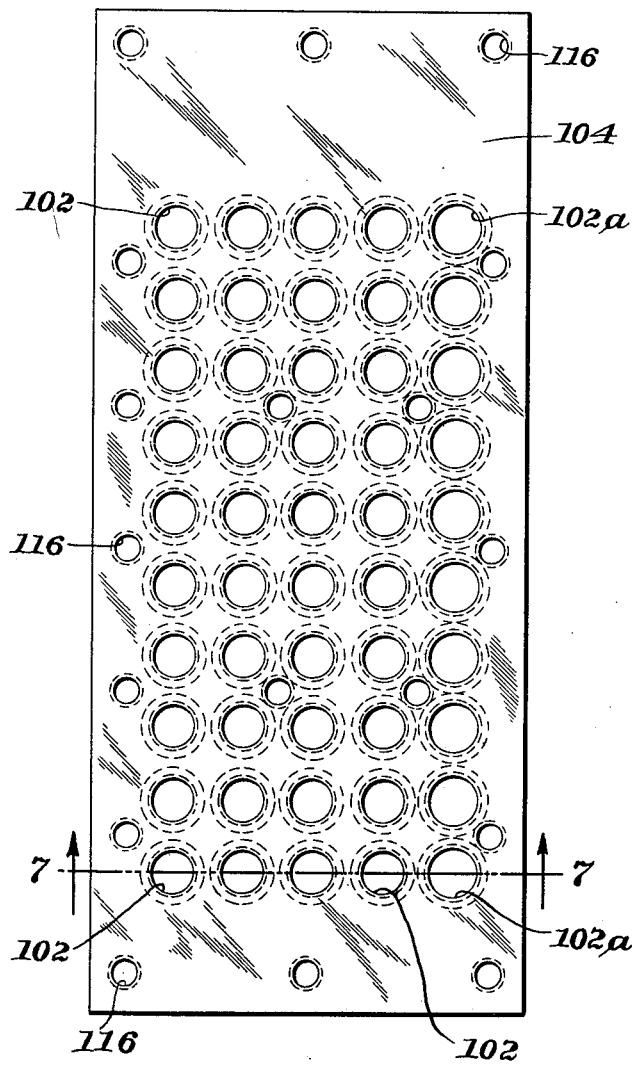
Figure 6 is a detail view on the line 6—6 of Figure 5.

Figures 12 and 13 are transverse sections on the lines 12—12 and 13—13 respectively of Figure 11.

Figure 14 is an edge view of the Figure 11 gasket.

Figures 15 and 16 are transverse sections on the lines 15—15 and 16—16 respectively of Figure 11.

Figure 17 is an edge view of the plate illustrated in Figure 18.

Figure 18 is a face view of the closure plate illustrated at the right of Figure 5, the view looking in the direction of the arrow 18 of Figure 5 and Figures 19 and 20 are transverse sections on the lines 19—19 and 20—20 of Figure 18, respectively.

Figures 1 to 4 illustrate the evaporating assembly or heat exchanger 10 of the present invention connected to certain of the elements of the refrigeration system with which it is used. Evaporator assembly 10 comprises a syrup cooling unit 12 including a bank 14 of syrup tubes 16. The water cooling unit is designated by the numeral 18 and consists of a pre-cooling section 20 formed of a bank 22 of water tubes 23. The water cooling unit also includes a main water cooling section 24 consisting of banks 26, 28, 30 and 32 of water tubes 25.

The liquid refrigerant to be used in the evaporator unit is supplied from a compressor or receiver, not shown, and moves through a line 40 to a heat exchanger 42. The refrigerant moves from heat exchanger 42 through a line 44 to a manifold 46. From manifold 46 the refrigerant moves in parallel through three lines, 48, 50 and 52 to expansion valves 54, 56 and 58, respectively. It will be observed that the line 52 is of larger capacity than the lines 48 and 50.

The expansion valve 54 controls the supply of refrigerant to the syrup cooling unit 12 and a line 60 (Figure 4) leads from valve 54 to the inlet end 62 of a bank of refrigerant tubes 63 of the form which Figure 5 shows surrounding water tubes. During its travel through this bank of refrigerant tubes the liquid refrigerant vaporizes and extracts heat from the syrup in the usual manner, and the now gaseous refrigerant is withdrawn from the syrup cooling evaporator through line 64 (Figure 1) to move into a common suction manifold 66.

The refrigerant supplied to the water precooling section 20 of the evaporator assembly moves from expansion valve 56 through a line 68 to the inlet 70 (Figure 4) of a refrigerant bank forming part of the water precooling evaporator section. The refrigerant leaves the water precooling section 20 by a line 72 which conducts the refrigerant to the common suction manifold 66.

The third expansion valve 58 has a line 76 leading therefrom to a distributor 78. Four refrigerant lines 80, 82, 84 and 86 lead from distributor 78 to the bottom of the respective banks 26, 28, 30 and 32 of the main water cooling section 24. The refrigerant passes through the banks 26, 28, 30 and 32 in parallel and leaves the refrigerant tubes of the respective banks by the lines 88, 90, 92 and 94 which join the common suction line 66.

It will be observed that the suction manifold 66, being connected to the suction side of the refrigerant tubes of the various banks in the evaporator, serves as a common return for the spent refrigerant gases drawn from the syrup cooling, water precooling, and main water cooling sections. In order to control the return of gases from the various banks and thus control the evaporating pressure and temperature established in the water and syrup cooling evaporators, a pressure responsive check valve 96 is positioned in the suction manifold 66 in advance of a line 98 through which the gases are returned to the heat exchanger 42. Valve 96 will control operation of the system in accordance with the refrigerant pressure within the manifold 66. From heat exchanger 42, the low pressure gas will be returned by heat exchanger outlet 43 to the suction inlet of the compressor in the usual manner.

Figures 5 to 20 illustrate the arrangement whereby the water and syrup tubes of the various banks are secured in the end header chambers. Figure 5 illustrates the refrigerant and water paths of the water bank 26 and thereby indicates the flow through the other water banks and the syrup bank. As indicated in Figure 5, the ends of the main water cooling tubes 25 are rolled or expanded into circumferentially grooved apertures 102 of tube plates 104 and 105. It will be understood that the ends of the water precooling tubes 23 and the syrup tubes 16 will be similarly secured in corresponding tube plates hereinafter described. The outer faces of the tube plates 104 and 105 are planar, flush with the tube ends, and perfectly smooth and have gaskets 106 and 107 in close contact therewith. A header plate 108 is secured against the outer surface of the gasket 106, and a header plate 109 is secured against the outer surface of the gasket 107. The tubes 25 and plates 104 and 105 will preferably be formed of stainless steel while the gaskets 106 and 107 will be formed of rubber of sufficient resiliency to maintain a seal with the plates, but not soft enough that it can be compressed to block the mouths of the tubes. The plates and gaskets at each end of the assembly will be secured together by bolts as hereinafter described.

Figure 5 also indicates the manner in which the refrigerant tubes 63 of a bank are connected for flow therethrough, it being noted that the headers 112 of the refrigerant tubes are spaced inwardly from the tube plates 104 and 105. By this arrangement if a leak develops at the joint between a refrigerant header and one of the water tubes 25, the leak will be capable of detection. It will also be noted from Figure 5 that the apertures 102 in the tube plates 104 and 105 are beveled to be enlarged at the points where the tubes enter the rear or inward surfaces of the plates. The beveling of the apertures enables the tubes 25 to be readily aligned with the tube plate during assembly.

It will be understood from the above that the tubes 23 of the water precooling bank 22 and the tubes 16 of the syrup cooling bank 14 are mounted in the same manner as illustrated in Figure 5 together with their respective refrigerant tubes.

Figure 7:
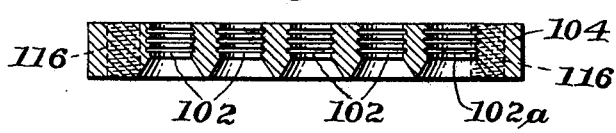
Figure 7 is a transverse section on the line 7—7 of Figure 6.

Figures 6 and 7 show the tube plate 104 of the water cooling unit 18, Figure 6 illustrating the outer face of the plate. It will be understood that tube plate 105 at the other end of this unit is of similar construction. Plate 104 is provided with a number of threaded apertures 116 at suitable points thereon and which are adapted to receive bolts as hereinafter described. Plate 104 also has four rows of apertures 102 therein arranged to receive the ends of the water tubes 25 of the main water cooling section. In addition, plate 104 has a fifth row of larger apertures designated 102a to receive the larger water tubes 23 of the water precooling section.

Figure 8:
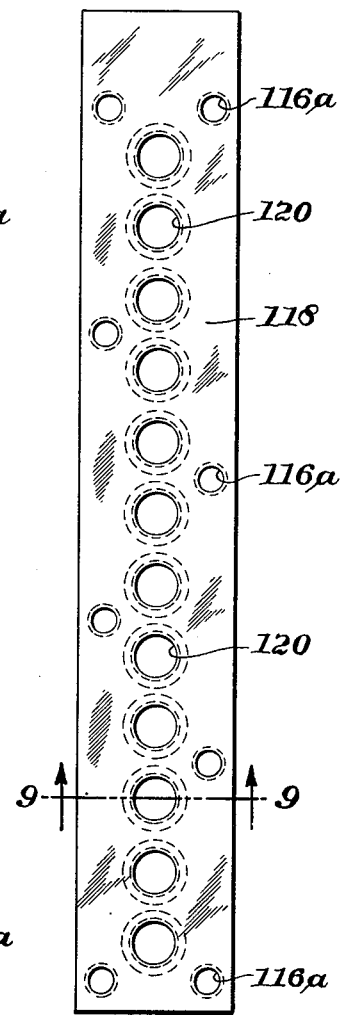
Figure 8 is a view similar to Figure 6 of a syrup cooling unit tube plate.
Figure 9:
Figure 9 is a transverse section on the line 9—9 of Figure 8.

Figures 8 and 9 illustrate one of the tube plates 118 of the syrup cooling unit. The tube plates of the unit will be provided with a line of apertures 120 of proper size to receive the syrup tubes 16 of this section. These plates are also equipped with threaded apertures 116a to receive bolts.

Figures 10 to 16 illustrate the gasket 106 which will be associated with the tube plate 104 provided at the water inlet and outlet end (the right-hand end of Figure 5) of the water cooling unit 18. It will be borne in mind that Figure 11 shows the outer face of the gasket viz., the face which lies away from the face of tube plate 104 illustrated in Figure 6 and shown at the right of Figure 5.

Figures 17 to 20 show the header plate 108 of the water cooling unit 18, Figure 18 showing the inner surface 122 of this plate. It will be observed that the plate is provided with bolt apertures 116b as well as a water inlet port 123 having a fitting aligned therewith and also a water outlet port 124 with an aligned threaded fitting. The plate also includes an aperture 125 to receive a venting plug and an aperture 126 to receive a drain plug.

The face 122 of header plate 108 is perfectly smooth and flush so that there will be no interruptions therein other than the apertures just mentioned. A flange 127 extends from the plate past the edges of the surface 122.

The end plate 109 (Figure 5) at the opposite end of the water cooling unit will be identical in form with plate 108 except that it will not include water inlet and outlet ports and need not be provided with vent and drain ports.

As is indicated in Figure 3, one header plate 128 of the syrup cooling unit 12 will be provided with an inlet and outlet to receive a syrup inlet fitting 129 and a syrup outlet fitting 130, respectively. The other syrup header plate will omit ports for such fittings.

As is indicated in Figure 5, all header plates and gaskets will be secured to the tube plates by bolts passing through the bolt apertures of the header plates and gaskets and into the tube plate threaded apertures.

Considering Figures 5, 6, 10 and 18, together, it will be observed that the water to be cooled will enter the water cooling unit 18 by a line opening to the port 123 (Figure 18) of header plate 108, the water thereby moving into the gasket aperture 131 (Figure 11) of gasket 106. The aperture 131 is of sufficient area to open to the large aperture 102a shown in the upper right-hand portion of the tube plate 104 in Figure 6. The water will flow through the water precooling tube 23 which is secured in this aperture 102a and into an aperture in the gasket 107 (Figure 5) at the opposite end of the unit, the last-mentioned aperture being large enough to communicate with the next lowest tube in the precooling section. The water returning through the last-mentioned tube will enter the gasket aperture or perforation 132 of Figure 11 which will conduct the water to the next lowest water tube. This alternate direction flow will continue through the tubes in the precooling bank 22 until the water discharges through the port 102a shown at the lower right of Figure 8 and into the triangular shaped aperture or cutout 133 illustrated in Figure 11 at the bottom of gasket 106.

Aperture 133 is of large enough area to communicate with all four of the smaller apertures 102 shown in Figure 6 in the lower line on tube plate 104. Hence, the water discharging from the pre-cooling section 20 will now be divided between the four banks 26, 28, 30 and 32 of the main water cooling section 24. As is indimated at the left of Figure 5, the apertures 134 in the gasket 107 at the opposite end of the water cooling unit will be of such form as to place a tube of each bank in communication with the next tube above in that bank. The water returning to gasket 106 from each tube will be directed by apertures 135 to the next tube above. This alternate direction flow of water will continue until the water discharges from the four apertures 102 shown in Figure 6 in the upper portion of tube plate 104 and also in Figure 4. These four tubes open to the triangular aperture or cutout 136 appearing in the upper left-hand portion of Figure 11. As is shown in Figure 5, aperture 136 is of sufficient vertical extent to communicate with the outlet port 124 in header plate 108.

It will be perceived from the above that the water to be cooled first moves through the water precooling section 20 and its bank 22 and that the water discharged from this bank is directed by the aperture 133 of gasket 106 into the four banks 26, 28, 30 and 32 of the main water cooling section. The water flows through the four just-mentioned banks in parallel to the discharge port 124.

It will be observed that the ports and tubes of the water precooling bank are of somewhat larger diameter than those of the main cooling banks.

It will also be noted from the description of the refrigerant flow set forth in the opening portion of this specification that the refrigerant supplied for the water precooling section 20 and its bank 22 moves in parallel with the refrigerant supplied for the banks 26, 28, 30 and 32 of the main water cooling section 24 and that the refrigerant likewise moves to the banks 26, 28, 30 and 32 in parallel.

By the above system, the water can first be precooled, and then, by dividing the flow, it can be further cooled to the desired extent. Also, the precooling water bank is in series with the other water cooling banks.

The manner in which the syrup flows through the syrup cooling bank will be clear from the above description.

As has been stated above, whenever the tubes of the evaporator assembly are to be cleaned, it is only necessary to disconnect the syrup and water piping from the header plates to which the piping is connected. Then the header plates at both ends of the assembly can be removed together with the corresponding gaskets. Cleaning elements can then be moved through the water and syrup tubes to thoroughly clean the same. The gaskets can be readily washed because they have no crevices therein other than the apertures. The inner surfaces of the header plates, being perfectly smooth, can also be readily and thoroughly cleaned, and the same is true of the outer surfaces of the tube plates.

The terminology used in the specification is for the purpose of description and not of limitation, the scope of the invention being defined in the claim.

We claim:

In a refrigeration system, an evaporator assembly including two tubes for liquid to be cooled, and an additional group of tubes for liquid to be cooled, a plurality of refrigerant tubes respectively positioned in heat exchanging relation with said liquid tubes, means to supply said two liquid tubes with different liquids in parallel, means to supply the corresponding refrigerant tubes with refrigerant in parallel, one of said two liquid tubes being connected to all of the liquid tubes of said group of liquid tubes and all of the latter being arranged for parallel flow with respect to each other, and means to supply refrigerant to the refrigerant tubes associated with said group of liquid tubes, said last-mentioned refrigerant tubes being connected in parallel with each other and in parallel with the refrigerant tubes associated with said two first-mentioned liquid tubes.

References Cited in the file of this patent

UNITED STATES PATENTS

| | | |
|---|---|---|
| 261,098 | Kunz | July 11, 1882 |
| 1,489,932 | Dickey | Apr. 8, 1924 |
| 1,875,663 | Sandstrom | Sept. 6, 1932 |
| 1,884,209 | Potter | Oct. 25, 1932 |
| 1,974,402 | Templeton | Sept. 18, 1934 |
| 2,039,796 | Hillyer | May 5, 1936 |
| 2,180,620 | Thrush | Nov. 21, 1939 |
| 2,344,606 | Edmonds | Mar. 21, 1944 |
| 2,511,582 | Grindrod | June 13, 1950 |

FOREIGN PATENTS

| | | |
|---|---|---|
| 413,811 | Great Britain | July 26, 1934 |